(12) United States Patent
Jakobi et al.

(10) Patent No.: US 12,441,038 B2
(45) Date of Patent: Oct. 14, 2025

(54) INJECTION MOLDING TOOL AND METHOD FOR THE PRODUCTION THEREOF, AND METHOD FOR PRODUCING MARBLED MOLDED PARTS

(71) Applicant: BASF SE, Ludwigshafen am Rhein (DE)

(72) Inventors: Reinhard Jakobi, Ludwigshafen (DE); Susanne Zeiher, Ludwigshafen (DE); Angelika Homes, Ludwigshafen (DE); Sascha Tim Schwendy, Ludwigshafen (DE); Natascha Manuela Meierhoefer, Ludwigshafen (DE); Daniel Leutz, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 616 days.

(21) Appl. No.: 17/768,281

(22) PCT Filed: Oct. 13, 2020

(86) PCT No.: PCT/EP2020/078774
§ 371 (c)(1),
(2) Date: Apr. 12, 2022

(87) PCT Pub. No.: WO2021/074148
PCT Pub. Date: Apr. 22, 2021

(65) Prior Publication Data
US 2024/0131762 A1 Apr. 25, 2024
US 2024/0227261 A9 Jul. 11, 2024

(30) Foreign Application Priority Data
Oct. 15, 2019 (EP) .................................... 19203163
May 5, 2020 (EP) .................................... 20172936

(51) Int. Cl.
*B29C 45/16* (2006.01)
*B29C 45/00* (2006.01)
(Continued)

(52) U.S. Cl.
CPC ...... *B29C 45/1634* (2013.01); *B29C 45/0046* (2013.01); *B29C 45/16* (2013.01);
(Continued)

(58) Field of Classification Search
CPC ...... B29C 2045/1698; B29C 2045/308; B29C 33/3842; B29C 45/0046; B29C 45/16;
(Continued)

(56) References Cited

U.S. PATENT DOCUMENTS 3,989,434 A * 11/1976 Mercer ................. B29C 45/581
425/207
4,303,382 A 12/1981 Gellert
(Continued)

FOREIGN PATENT DOCUMENTS

CA 2861399 A1 8/2013
DE 1933570 A1 1/1971
(Continued)

OTHER PUBLICATIONS

International Search Report for corresponding PCT/EP2020/078774 mailed Dec. 15, 2020. 3 Pages.
(Continued)

*Primary Examiner* — Philip C Tucker
*Assistant Examiner* — Jimmy R Smith, Jr.
(74) *Attorney, Agent, or Firm* — Armstrong Teasdale LLP

(57) ABSTRACT

Disclosed herein is an injection mold for production of marbled moldings, including at least one hot runner, a cavity, an entry opening into the injection mold and an inlet into the cavity, where the hot runner has at least two ducts that are connected at a first end of each duct to the inlet into the
(Continued)

Figure 1:
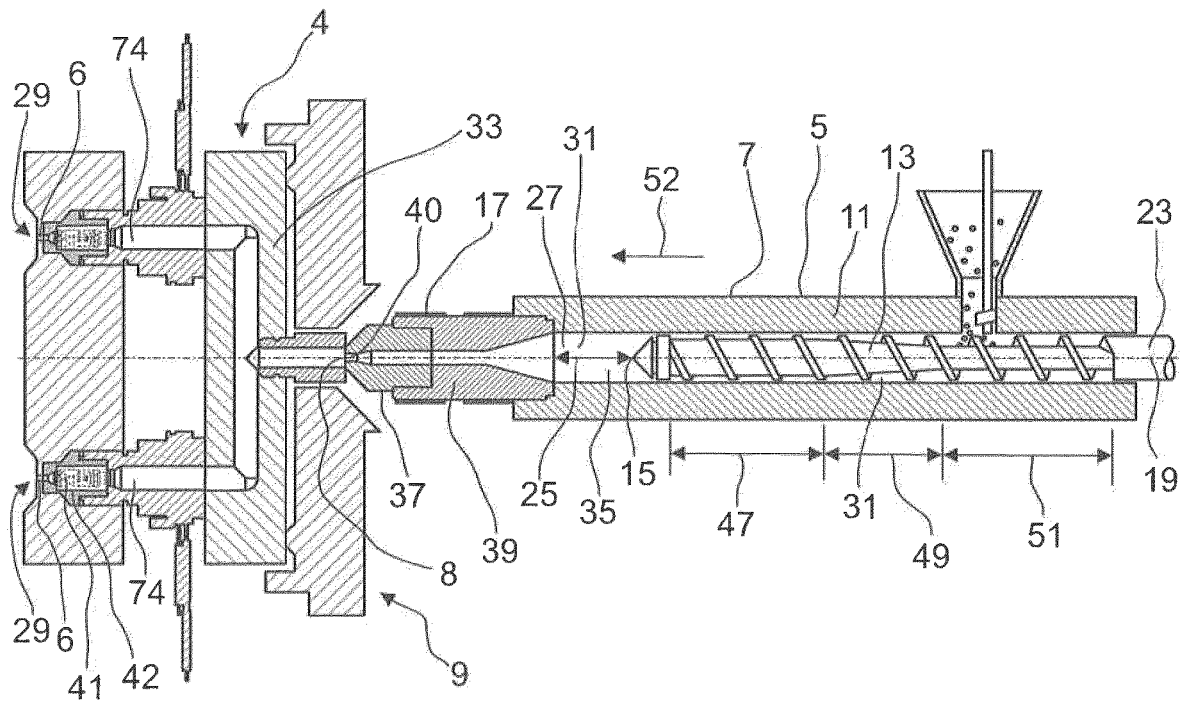

cavity and at a second end of each duct to the entry opening into the injection mold, where the at least two ducts each at least partly form a spiral, and the at least two ducts are bounded by a one-piece component. Further disclosed herein is a process for producing the injection mold and a process for producing marbled moldings.

12 Claims, 7 Drawing Sheets

(51) Int. Cl.
  *B29C 45/20* (2006.01)
  *B29C 45/30* (2006.01)
  *B29C 45/50* (2006.01)
  *B33Y 10/00* (2015.01)
  *B33Y 80/00* (2015.01)
  B29C 33/38 (2006.01)
  B29K 67/00 (2006.01)
  B29K 105/00 (2006.01)
  B29L 31/00 (2006.01)

(52) U.S. Cl.
  CPC .............. *B29C 45/20* (2013.01); *B29C 45/30* (2013.01); *B29C 45/50* (2013.01); *B33Y 80/00* (2014.12); B29C 33/3842 (2013.01); B29C 2045/1698 (2013.01); B29C 2045/308 (2013.01); B29K 2067/006 (2013.01); B29K 2105/0032 (2013.01); B29K 2995/0021 (2013.01); B29L 2031/7132 (2013.01); B33Y 10/00 (2014.12)

(58) Field of Classification Search
  CPC . B29C 45/1634; B29C 45/1858; B29C 45/20; B29C 45/30; B29C 45/50; B29C 45/581; B29C 2045/0049; B29C 2045/302; B29C 2045/304; B29C 2045/306; B29K 2067/006; B29K 2105/0032; B29K 2995/0021; B29L 2031/7132; B33Y 10/00; B33Y 80/00
  See application file for complete search history.

(56) References Cited

U.S. PATENT DOCUMENTS

| | | | |
|---|---|---|---|
| 5,405,258 | A | 4/1995 | Babin |
| 6,089,468 | A | 7/2000 | Bouti |
| 6,245,278 | B1 | 6/2001 | Lausenhammer et al. |
| 2015/0110918 | A1 | 4/2015 | Dezon-Gaillard et al. |

FOREIGN PATENT DOCUMENTS

| | | |
|---|---|---|
| DE | 19730380 A1 | 1/1999 |
| EP | 0059408 A1 | 9/1982 |
| EP | 0614746 A1 | 9/1994 |
| EP | 0546554 B1 | 3/1997 |
| EP | 2781332 A1 | 9/2014 |
| FR | 2482899 A1 | 11/1981 |
| GB | 2028218 A | 3/1980 |
| JP | S57125027 A | 8/1982 |
| JP | S57203524 A | 12/1982 |
| JP | H0392320 A | 4/1991 |
| JP | H10168253 A | 6/1998 |
| JP | H11138530 A | 5/1999 |
| WO | 97/20674 A1 | 6/1997 |
| WO | 2001034365 A1 | 5/2001 |
| WO | 2004098759 A1 | 11/2004 |
| WO | 2009055097 A1 | 4/2009 |
| WO | 2011156436 A1 | 12/2011 |
| WO | 2012051079 A1 | 4/2012 |
| WO | 2013122789 A1 | 8/2013 |
| WO | 2014133702 A1 | 9/2014 |
| WO | 2019145877 A1 | 8/2019 |

OTHER PUBLICATIONS

Stueck et al., "Verweilzeit im Griff", Plastverarbeiter 54, Nr. 4, pp. 56-57 (2003) XP009011004.

* cited by examiner

INJECTION MOLDING TOOL AND METHOD FOR THE PRODUCTION THEREOF, AND METHOD FOR PRODUCING MARBLED MOLDED PARTS

CROSS-REFERENCE TO RELATED APPLICATIONS

This application is a U.S. National Phase Application of International Patent Application No. PCT/EP20/78774, filed Oct. 13, 2020, which claims priority to European Patent Application No. EP19203163.1, filed Oct. 15, 2019, and European Patent Application No. 20172936.5, filed May 5, 2020, each of which is hereby incorporated by reference herein.

The invention relates to an injection mold for production of marbled moldings, comprising at least one hot runner, a cavity, an entry opening into the injection mold and an inlet into the cavity, wherein the hot runner has at least two ducts that are connected at a first end of each duct to the inlet into the cavity and at a second end of each duct to the entry opening into the injection mold.

The invention further relates to a process for producing marbled moldings, wherein a first molding compound and at least one further molding compound are injected into an injection mold from an injection unit of a screw injection molding machine, and the injection mold has at least one hot runner and a cavity.

A marbled molding typically has at least one marbled, i.e. patterned, visible face that shows surface effects such as color shadowing, colored streaks, lines and structures. In marbled moldings, at least a portion of the colorants present is not distributed uniformly. The formation of the marbling effects is dependent on the proportions of different colors and the main color of the molding. Marbled moldings are frequently not entirely visually identical. If they show a repeating recognition pattern in the color structure, they can also be referred to as moldings with reproducible marbling. Particularly the main color, the shadowing and the main pattern exist in repeating form in reproducibly marbled moldings, although variations in the brightness of the coloring can occur.

Production of moldings, especially polymer moldings made from powders, pellets or molding compounds, which may each take the form of mixtures, is frequently accomplished using screw injection molding machines. For the production of colored polymer articles, colored polymer pellets are frequently used, or color-neutral pellets are mixed with colored polymer pellets having high pigment concentration before or during the liquefaction of the polymer in an extruder. Typically, mixing elements used in injection units ensure that the mixtures consisting of an uncolored base material and color pellets comprising a high concentration of colorants mix with maximum homogeneity, and components without streaks on the surface are produced.

Screw injection molding machines and screw injection molds with a hot runner typically enable uniform plastification or processing, in which the molding compound to be injected is mixed homogeneously and has a uniform temperature. In the production of marbled moldings, the aim is a uniform temperature, but the homogeneous mixing of the molding compounds to be injected is undesirable, such that varying color components remain visible in the finished component.

Specifically for production of reproducible marbling patterns in which uniform repetition of the color progression and the color distribution is the aim, machines used are typically those in which at least two components that generate the marbling are supplied separately, for example in two separate injection units, to the injection mold.

Also known for production of marbled moldings are apparatuses, especially nozzles, which enable combination of molding compounds from two separate injection units in one injection mold.

The production of reproducibly marbled moldings in two-component injection molding machines is complex since two injection units are required and have to be operated, each of which has a screw, a barrel, feed devices and corresponding hydraulics for movement of the screw.

The molding compounds are injected from the screw injection molding machine into the injection mold which may comprise a hot runner or else a hot runner system having multiple parallel melt ducts that lead to correspondingly multiple cavities.

A hot runner or hot runner system refers to a particular design of the gate system in the processing of plastics, especially in the machine injection molding of thermoplastics. Compared to further components of the injection mold, the hot runner is thermally insulated and its temperature may be controlled separately, especially separately from the further components of the injection mold.

In injection molds that do not comprise a hot runner, the gate system is not thermally insulated from the further parts of the injection mold. Here, therefore, both the injection mold and the gate system present therein, for example a screw gate, a film gate or a tunnel gate, are kept at controlled temperatures below a melting temperature of the molding compounds. By virtue of these low temperatures, the molding compounds already solidify in the gate system during the production of the molding. In this way, a sprue is formed, i.e. a projection of the molding, which does not form part of the desired geometry of the molding and which has to be separated from the molding produced in an additional working step. The sprue can be removed manually or by machine by means of additional functional elements in the injection mold or after the production of the molding. The removal of the sprue may leave a mark or defect on the molding, which shows where the sprue was disposed.

In addition, in the case of a gate system without a hot runner, a portion of the molding compound injected into the injection mold remains in the gate system and does not flow into the molding. The remaining portion of the molding compounds has to be recycled or disposed of, and the shot volume is increased by the remaining sprue, since more molding compound has to be plastified than is present in the finished molding. This leads to energy disadvantages, and disadvantages with regard to the dimensions of the injection molding machine.

By contrast, the molding compounds in an injection mold with a hot runner remain free-flowing, and no solidification of the molding compounds in the gate system takes place, such that no sprue remains on the molding. Furthermore, a hot runner enables longer flow pathways in the injection mold, since any pressure drop resulting from cooling of the molding compounds and an associated increase in viscosity is avoided.

The hot runner typically has a hot runner nozzle which is disposed at the inlet into the cavity and constitutes the transition between heated and unheated zone that comprises the cavity in the injection mold. The hot runner nozzle thus constitutes the delimitation between the liquid molding compounds and the solidifying molding compounds.

A hot runner may be designed as an open system or closed system. In a closed system, the injection point, i.e. the outlet of the hot runner nozzle, may be closed. For this purpose, the hot runner has further components as closure elements. The closure element is typically a needle valve, which can be positioned and is movable by means of a separately actuatable mechanism operable in a pneumatic, hydraulic or electrical manner.

WO 2004/098759 A1 describes an injection molding apparatus having a duct system comprising a static mixer. The static mixer has a multitude of passages and mixing portals in order to generate a homogeneous stream of molding compounds.

CA 2 861 399 is directed to an injection molding machine which comprises a distributor plate and a nozzle that extends through the distributor plate. The distributor plate and the nozzle are part of a hot runner arrangement.

WO 2013/122789 A1 discloses a mold system having a valve-pin assembly, which enables the movement of a pin in an exit opening of a nozzle. The wall of the melt duct in a nozzle has projections that serve to guide the pin.

WO 2011/156436 A1 is directed to a mold system comprising a nozzle housing and a valve shaft. A groove structure surrounding the valve shaft is disposed in a nozzle tip when the valve shaft is in a forward position. The guiding of the valve shaft is integrated into the nozzle tip, with simultaneous guiding of the valve shaft and availability of passages for the molding compound.

U.S. Pat. No. 6,245,278 B1 describes an injection nozzle comprising a longitudinal duct and a multitude of angled ducts that branch off the longitudinal duct. Resultant vortexing is said to improve flushing and accelerate a color change with regard to the molding compounds.

WO 2012/051079 A1 relates to a mold system having a nozzle tip, wherein an outer surface of the nozzle tip has multiple outlets, such that melt streams cut across one another along the outer surface. This reduces weld lines and improves the stress cracking resistance of the component produced.

WO 2014/133702 A1 discloses a hot runner for an injection molding machine, comprising a conditioning zone in which an essentially homogeneous thermal profile is generated in the processed melt. It is possible, for example, to provide fins or lamellas for guiding of a needle.

WO 01/34365 A1 and U.S. Pat. No. 6,089,468 relate to melt stream mixers for injection molding machines. A flow duct in which a needle is guided has a spiral groove. The depth of the spiral groove decreases in the direction of the outlet zone, such that a resin stream flows helically through the spiral groove and, in the direction of the outlet zone, increasingly flows axially over lands of the spiral groove. This eliminates weld lines in the finished product. The spiral groove may also be designed as a double spiral groove, in which case an inner groove section is executed on an outer surface of a separate torpedo or of a valve shaft.

WO 2009/055097 A1 and U.S. Pat. No. 5,405,258 relate to a hot runner nozzle system comprising a torpedo with improved exchangeability and for improved temperature distribution. Also described is a nozzle housing comprising a sieve.

EP 546 554 also has for its subject matter an injection molding apparatus having a hot runner nozzle comprising a torpedo. The torpedo is secured in the hot runner nozzle by means of a soldered connection.

It is an object of the present invention to provide an injection mold and a process for producing marbled moldings, wherein the marbling pattern generated is variable in a reproducible and controlled manner, and high detail and reproducibility of the marbling pattern are simultaneously achieved. Furthermore, it is to be possible to use the same injection mold for different patterns with little modification work and simultaneously high reproducibility.

This object is achieved by an injection mold for production of marbled moldings, comprising at least one hot runner, a cavity, an entry opening into the injection mold and an inlet into the cavity, wherein the hot runner has at least two ducts that are connected at a first end of each duct to the inlet into the cavity and at a second end of each duct to the entry opening into the injection mold, wherein the at least two ducts each at least partly form a spiral, and the at least two ducts are bounded by a one-piece component.

Additionally proposed is a process for producing marbled moldings, wherein a first molding compound and at least one further molding compound are each added separately in time and/or space to an injection unit of a screw injection molding machine and injected from the injection unit of the screw injection molding machine into an injection mold, wherein the injection mold comprises at least one hot runner, a cavity, an entry opening into the injection mold and an inlet into the cavity, wherein the hot runner has at least two ducts that are connected at a first end of each duct to the inlet into the cavity and at a second end of each duct to the entry opening into the injection mold.

In the process, preference is given to using an injection unit comprising a barrel, a screw having a screw tip and a nozzle, wherein the screw is rotatable and is disposed in the barrel so as to be movable in the direction of the longitudinal axis of the barrel between a forward position and a backward position, with a smaller distance between the screw tip and the nozzle in the forward position than in the backward position, and wherein the first molding compound comprises a first polymer compound and a first colorant, and the at least one further molding compound comprises a further polymer compound and optionally at least one further colorant. The method further preferably comprises the following steps:

a) optionally feeding a first amount of the first molding compound onto the screw when the screw is in the backward position, b) optionally advancing the screw from the backward position into the forward position, c) feeding a second amount of the at least one further molding compound onto the screw, d) plastifying the first molding compound and the at least one further molding compound in the barrel of the screw, with rotation of the screw and conveying of at least a portion of the first molding compound and at least a portion of the at least one further molding compound into a clear space in the barrel between the nozzle and the screw tip, and with the screw moving from the forward position into the backward position, e) feeding a new first amount of the first molding compound onto the screw when the screw is in the backward position, f) injecting the first molding compound and the at least one further molding compound from the clear space in the barrel into the cavity of the injection mold, with the screw advancing from the backward position into the forward position, g) cooling the first molding compound and the at least one further molding compound in the injection mold, so as to give a marbled molding, h) removing the marbled molding from the injection mold, wherein steps c) to h) are repeated, step e) is conducted before step f), and step a) is optionally conducted before step b), and wherein the feeding of the new first amount of the first molding compound in step e) and optionally the feeding of the first amount of the first molding compound in step a) is conducted separately in time and/or space from the feeding of the second amount of the at least one further molding compound in step c).

The separation of the feeding of the first molding compound and of the at least one further molding compound in time and/or space limits the homogenization of the first molding compound and the at least one further molding compound during plastification, such that defined color boundaries and reproducible marbling patterns are visible in the molding produced. The addition of the first molding compound and of the at least one further molding compound can also be referred to as sequential or discrete. Accordingly, the first molding compound is distributed inhomogeneously in the at least one further molding compound prior to injection into the clear space between the nozzle and the screw tip.

Depending on the geometry of the at least two ducts in the hot runner, a defined, reproducible, i.e. repeatedly producible, pattern is established on at least one visible face of the marbled molding produced.

Reproducible marbling patterns are understood to mean patterns wherein the variances, if different moldings are compared with one another, are not perceived as being distinctly different by the human eye when they have been produced by the same process and the same apparatus. The moldings produced by the process of the invention or with the injection mold of the invention have patterns that repeat reliably and are discernible. This is achieved especially via the defined feeding of the molding compounds and the configuration of the hot runner.

The marbled moldings produced in accordance with the invention are especially usable for decorative purposes in the consumer goods sector. The marbled moldings may be completely marbled or comprise at least one marbled visible face. The marbled moldings may be three-dimensional or flat. The marbled moldings are preferably domestic articles such as dishes, plates, cups, coasters, handles or toilet seats, consumer goods such as laptop covers or protective cases for telephones or smartphones, toys such as spinning disks or spinning tops, accessories in the fashion industry such as buttons, or decorative elements in vehicle interiors, such as visors or covers.

The first molding compound and the at least one further molding compound are fed to the barrel of the injection unit and conveyed forward toward the nozzle in conveying direction by rotation of the screw of the injection molding machine. This at least partly, preferably completely, plastifies the first molding compound and the at least one further molding compound. The at least one further molding compound and optionally the first molding compound accumulate in the clear space between the nozzle and the screw tip, and move the screw axially backward into the rear position in the barrel. Preferably, the screw injection molding machine comprises exactly one injection unit and more preferably exactly one barrel and further preferably exactly one screw.

The feeding can also be referred to as metering, with arrival of the first molding compound or the at least one further molding compound, for example, via a funnel into a barrel and especially to the screw. The first molding compound and the at least one further molding compound are supplied in portions, separately from one another in time and/or space. What is meant by "in portions" is that the first molding compound and preferably also the at least one further molding compound are fed to the barrel discontinuously in the form of discrete portions, i.e. in the form of the first amount or of the second amount.

The plastifying is also referred to as dispensing, with conveying of the first molding compound and the at least one further molding compound by the screw in the direction of the nozzle and at least partial melting thereof. Preferably, at least a portion of the first molding compound and at least a portion of the at least one further molding compound are melted completely during the plastifying in step d).

The feeding of the second amount of the at least one further molding compound in step c) is preferably conducted after the advance of the screw in step b).

Further preferably, the feeding of the new first amount of the first molding compound in step e) and optionally the feeding of the first amount of the first molding compound in step a) is complete before the advance in step b) commences. In addition, the advance in step b) is preferably complete before the feeding of the second amount of the at least one further molding compound in step c) commences.

The first molding compound preferably first comes into contact with the screw and then with the at least one further molding compound.

The first molding compound and/or the at least one further molding compound may be fed separately and directly into the barrel and especially directly onto the screw with a metering system.

Further preferably, the feeding of the second amount of the at least one further molding compound commences when the screw is in the forward position. The screw is preferably in the forward position when it has been moved to the maximum extent in the direction of the nozzle.

The at least one further molding compound, especially the second amount of the at least one further molding compound, can be fed in continuously. Preferably, the second amount of the at least one further molding compound is fed in continuously at least during the plastifying in step d).

Especially when the new first amount of the first molding compound in step e) and optionally the first amount of the first molding compound in step a) are fed in spatially separately from the feeding of the second amount of the at least one further molding compound in step c), the second amount of the at least one further molding compound can be fed in continuously during the feeding of the new first amount of the first molding compound in step e) and optionally during the feeding of the first amount of the first molding compound in step a).

When the new first amount of the first molding compound in step e) and optionally the first amount of the first molding compound in step a) are conducted spatially separately from the feeding of the second amount of the at least one further molding compound in step c), the new first amount for the first amount of the first molding compound is preferably fed in at a greater distance from the nozzle than the second amount of the at least one further molding compound.

After the plastifying, the rotation of the screw is preferably stopped, and the screw is moved forward into the forward position in conveying direction, such that the plastified first molding compound and the plastified at least one further molding compound are pushed through the nozzle into the cavity of the injection mold.

The feeding of the new first amount of the first molding compound to the screw at the moment when the screw is in the backward position achieves synchronization of the pattern formation with the rhythm or timing of the injection operation, and hence ensures the reproducibility of the pattern in successively produced marble moldings. More preferably, the screw is at rest in the backward position while the first amount of the first molding compound is fed in.

The volume of the plastified molding compound comprising the at least one further molding compound and optionally the first molding compound which is present between the nozzle and the screw tip prior to injection into the clear space is also referred to as dosage volume; subtracting a mass cushion therefrom gives the shot volume.

After the injecting in step f), the barrel is filled again. The second amount of the at least one further molding compound is fed in, plastification is effected again, and the screw moves back into the backward position. Thereafter, the first amount of the first molding compound is fed in, and injection is effected again.

The plastifying is preferably concluded at least once, more preferably at least twice, especially at least four times, with the at least one further molding compound and optionally with the first molding compound when the first amount of the first molding compound is fed in in step a). Preferably, the at least one further molding compound and optionally the first molding compounds are present in the barrel when the first amount of the first molding compound is fed in in step a).

Preferably, the first molding compound and/or the at least one further molding compound is/are fed to a backward portion of the barrel. The rear portion is understood to mean preferably not more than 50% of a total length of the barrel, more preferably not more than 20% of a total length of the barrel, at an end of the barrel remote from the nozzle of the screw injection molding machine. The first molding compound and the at least one further molding compound can be supplied to the barrel at the same position or at different positions or feed openings. More particularly, the first molding compound and the at least one further molding compound are fed to the barrel at various positions in the same feed opening.

The barrel has different internal diameters depending on the product to be produced. The internal diameter is, for example, within a range from 10 mm to 150 mm, preferably from 25 mm to 50 mm, for example 25 mm or 30 mm. The exit opening of the barrel has a passage, for example, with a diameter of 1.5 to 10 mm, preferably from 3 to 6 mm, for example 5 mm.

The first molding compound and the at least one further molding compound may be fed in in the form of powders, pellets or plastic masses. The first molding compound and/or the at least one further molding compound may each take the form of a homogeneous and/or heterogeneous mixture.

Preferably, the first molding compound and/or the at least one further molding compound is/are fed in as pellets. Pellets refer generally to a free-flowing solid-state material which is, for example, cylindrical or lenticular and preferably has a maximum length of 1 mm to 10 mm, more preferably of 3 mm to 6 mm.

The first molding compound preferably comprises a first pellet material comprising the first polymer compound and the first colorant. The first pellet material may also be referred to as colored pellet material, which is preferably produced in an upstream step preceding the process of the invention. The first molding compound may also be referred to as marbling batch or concentrate.

In particular, the at least one further molding compound, before being fed in, may comprise a mixture including at least two further pellet materials, especially a second pellet material and a third pellet material. The at least one further polymer compound may be present in the second pellet material, and the at least one further colorant may be present in the third pellet material.

Preferably, the marbled molding consists of the first molding compound and the at least one further molding compound.

The screw of the injection molding machine preferably has an intake zone, a compression zone and a metering zone, which can also be referred to as ejection zone or homogenization zone.

The screw is preferably a single-flight screw. The screw especially has exactly one flight in which the first molding compound and the at least one further molding compound are conveyed. Further preferably, the screw of the screw injection molding machine has a flat screw flight. The flight depth in the intake zone is preferably 0.05 to 0.15 times the outer screw diameter, and the flight depth in the metering zone is 0.025 to 0.075 times the outer screw diameter. A compression ratio, which refers to a ratio between a flight volume of the intake zone of the screw to a flight volume of the metering zone of the screw, is preferably at least 2, more preferably more than 2. The screw preferably has a length within a range from 20 times to 23 times the outer screw diameter. A low screw flight has the advantage that less material is accommodated for the same diameter.

The screw of the screw injection molding machine may comprise a nonreturn valve, preferably disposed between the screw tip and the screw flight. The screw tip may have projections, especially 3 to 4 projections.

The injection unit of the injection molding machine preferably comprises a heating apparatus. The heating apparatus may surround the barrel completely, preferably partially. The nozzle of the screw injection molding machine may also included a heating apparatus. The heating apparatus assists the melting of the first molding compound and the at least one further molding compound.

Preferably, the cooling of the first molding compound and of the at least one further molding compound in the injection mold in step g) is conducted simultaneously with the plastifying of the first molding compound and of the at least one further molding compound in the barrel in step d), and optionally at least partly simultaneously with the feeding of the second amount of the at least one further molding compound in step c).

Preferably, steps c) to h) are repeated more than once, more preferably more than three times, further preferably more than four times and especially preferably more than five times, in order to produce multiple marbled moldings successively. Preferably, steps a) to f) are conducted in the sequence specified.

Furthermore, the injecting in step f) is preferably repeated with an injection frequency, and each injection or advance may be referred to as one shot. In addition, the feeding of the new first amount of the first molding compound in step e) is preferably repeated with a feed frequency. The feed frequency is preferably chosen such that it varies from the injection frequency by not more than 10%, further preferably by not more than 5% and especially preferably by not more than 1%. Correspondingly, the feeding of the new first amount of the first molding compound in step e) is especially preferably conducted with the cycle of injection in step f). In this case, the feeding of the new first amount of the first molding compound in step e) is preferably executed with a time delay from the injection in step f). More preferably, the feeding frequency is equal to the injection frequency. In this case, the first amount of the first molding compound is always executed with the same time delay from the injection or advance.

For a marbled molding, the feeding of the new first amount of the first molding compound in step e) and/or the feeding of the first amount of the first molding compound in step a) can be conducted before or after the feeding of the second amount of the at least one further molding compound in step c).

As well as the first molding compound, the barrel may also be supplied with at least two further molding compounds, by means of which it is possible to produce multicolor moldings additionally having a marbling pattern. The at least one further molding compound may be divided into multiple portions, in which case the multiple portions are preferably each fed in successively or stepwise.

In addition, after the injection in step f), a hold pressure may be exerted by the screw of the screw injection molding machine on the molding in the injection mold. The hold pressure is preferably exerted before the plastifying in step d). While a hold pressure is being exerted by the screw on the molding in the injection mold, the screw is preferably in the forward position in the barrel or still in motion in conveying direction, in order to push more plastified molding compound into the injection mold, so as to compensate for material shrinkage in the course of cooling of the molding in the injection mold.

The second amount of the at least one further molding compound is preferably fed in in step c) while the hold pressure is being exerted on the injection mold. More preferably, the second amount of the at least one further molding compound is fed in in step c) when the exertion of the hold pressure is commenced.

Preferably, a ratio of a maximum internal free volume of the barrel that can be occupied by the first molding compound and the at least one further molding compound to an internal volume of the cavity is not more than 15, more preferably not more than 10, further preferably not more than five and especially from 2 to 5. The maximum internal free volume of the barrel may also be referred to as melt duct of the injection molding machine.

Preferably, the internal free volume beneath a feed opening and especially on the screw is filled only to an extent of 0% by volume to 80% by volume, more preferably of 10% by volume to 50% by volume, with the first molding compound and/or the at least one further molding compound or with the pellets of the first molding compound and/or the pellets of the at least one further molding compound. This can also be referred to as underfeeding, where the first molding compound and the at least one further molding compound are fed in at a reduced mass flow rate compared to a maximum mass flow rate conveyable by the screw.

Correspondingly, the barrel and the screw of the screw injection molding machine are designed such that there are preferably not more than 15, more preferably not more than 10, further preferably not more than 5 and especially from 2 to 5 shots in the injection unit, especially prior to injection.

The low internal free volume of the barrel of the screw injection molding machine results in a short dwell time for the first molding compound and the at least one further molding compound in the injection unit, which counteracts homogeneous mixing of the first molding compound with the at least one further molding compound and hence promotes the creation of a marbling pattern. The dwell time of the first molding compound and/or the at least one further molding compound in the barrel is preferably within a range from 1 second to 15 minutes, more preferably from 0.1 minute to 4 minutes, especially preferably from 0.5 minute to 2 minutes.

By virtue of the process of the invention, the first molding compound is contacted as late as possible with the at least one further molding compound in the barrel in order to limit the extent of mixing as far as possible. The reduction in the dwell time by virtue of a correspondingly small internal free volume of the barrel also minimizes the mixing of the first molding compound with the at least one further molding compound.

Preferably, a ratio of the sum total of the mass of the first amount of the first molding compound and the mass of the second amount of the at least one further molding compound to the mass of the marbled molding is 0.5 to 1.5, more preferably 0.8 to 1.2, further preferably 0.9 to 1, especially 1. This ratio is, for example, greater than 1 when, in the production of the marbled molding, at least one sprue is present, which also comprises the first molding compound and the further molding compound, but is removed from the marbled molding after production and is not part of the marbled molding. A ratio of less than 1 may exist, for example, when inserts, especially metal inserts, are integrated into the molding or two-component moldings that may have different hardnesses are produced, in which first a first component and then a second component are injected into the cavity, with the first component and/or the second component having marbling. By virtue of a ratio close to 1, the marbling, especially individual elements of the marbling pattern, such as rings or apexes, are positioned at a comparable location in successively produced marbled moldings, meaning that the reproducibility of the marbling over different marbled moldings is optimized, especially since the specific mass ratios are matched to the size of the molding and the rhythm of the injection. Concealment of different patterns from different injection operations is avoided.

Correspondingly, it is preferable that each shot is added individually, with the first molding compound for one shot and the at least one further molding compound for the same shot being supplied in the spatially and/or locally separated steps e) and optionally a) or c). The addition of the first molding compound and the at least one further molding compound is preferably effected in specific amounts, with the first amount and the second amount each being sufficient for exactly one shot.

Preferably, a mass ratio of the first amount to the second amount is less than 0.1, more preferably less than 0.01 and especially less than 0.001. The first molding compound serves to form the marbling pattern in the at least one further molding compound that constitutes the base compound.

A ratio of a first concentration of the first colorant in the first molding compound to a further concentration of the at least one further colorant in the at least one further molding compound is preferably more than 20, more preferably more than 50 and especially more than 100. Correspondingly, it is preferable when the first colorant is at a higher concentration in the first molding compound than the at least one further colorant which is optionally present in the at least one further molding compound. The at least one further molding compound may already have been colored with the at least one further colorant before the at least one further molding compound comes into contact with the first molding compound.

Preferably, the first molding compound comprises 10% by weight to 60% by weight, more preferably 20% by weight to 40% by weight, based on the first molding compound, of the first colorant. The at least one further molding compound comprises preferably 0.1% by weight to 6% by weight, more preferably 0.2% by weight to 4% by weight, based on the at least one further molding compound, of the at least one further colorant.

By virtue of the concentration ratios stated, good recognizability and sharpness of the marbling pattern is assured, which assists the reproducibility of the pattern.

The second amount may comprise one or more further molding compounds. The first polymer compound and/or the at least one further polymer compound are preferably thermoplastic molding compounds. More preferably, the first polymer compound and/or the at least one further polymer compound comprise a polymer selected from the group consisting of polypropylene (PP), polyethylene (PE), polyoxymethylene (POM), polyethylene terephthalate (PET), polybutylene terephthalate (PBT), polyamide (PA), polycarbonate (PC), polyarylethersulfones (PSU, PESU, PPSU), thermoplastic polyurethanes (TPU), polybutylene adipate terephthalate (PBAT), polybutylene succinate (PBS), polylactide (PLA), polybutylene sebacate terephthalate (PBSeT), polyethylene naphthalate (PEN), polyacrylmethacrylate (PMMA), polystyrene (PS), styrene-containing polymers such as acrylonitrile-butadiene-styrene copolymer (ABS) or mixtures thereof. The at least one further molding compound and optionally the first molding compound may be filled or reinforced molding compounds. More particularly, the at least one further molding compound and optionally the first molding compound may comprise at least one filler such as talc, glass beads or fibers, such as glass fibers or carbon fibers.

More preferably, a polymer present in the first polymer compound is also present in the at least one further polymer compound. Further preferably, the first polymer compound and/or the at least one further polymer compound comprise PBT; more preferably, the first polymer compound and the at least one further polymer compound comprise PBT.

The first colorant and/or the at least one further colorant may be soluble or insoluble in the first molding compound and/or in the at least one further molding compound during the process. The first colorant and/or the at least one further colorant are preferably color pigments. The first colorant is preferably a black colorant. The first colorant preferably comprises industrial carbon black, which is also referred to as carbon black, or a diaminophenazine compound such as nigrosin. More preferably, the first colorant consists of carbon black or at least one diaminophenazine compound such as nigrosin. The at least one further colorant is preferably a blue colorant, green colorant, yellow colorant, red colorant, beige colorant, orange colorant, white colorant, gray colorant, brown colorant or gold colorant.

If the barrel is supplied not only with the first molding compound but with at least two further molding compounds, each further molding compound may comprise a further polymer compound and optionally at least one further colorant. The further molding compounds may be added to the barrel together with or before or after, optionally directly before or directly after, the at least one further molding compound. The at least two further molding compounds may also be fed in continuously.

The viscosity of the first molding compound and/or of the at least one further molding compound, each in plastified form, is preferably within a range from 50 Pa·s to 1000 Pa·s. The injection rate of the plastified molding compounds from the nozzle of the screw injection molding machine into the injection mold is preferably more than 25 cm 3/s, more preferably from 50 cm³/s to 100 cm³/s, especially from 60 cm³/s to 80 cm³/s, for example 70 cm³/s. The backpressure, which typically refers to the pressure in the free space in the barrel, is preferably 1 bar to 100 bar, more preferably 10 bar to 70 bar and further preferably 20 bar to 50 bar.

The entry opening in the injection mold is disposed on a side of the injection mold facing the exit opening of the nozzle of the injection unit, such that the plastified molding compound, especially the first molding compound and the at least one further molding compound, can be pushed from the nozzle of the injection unit through the entry opening into the injection mold. From the entry opening, the plastified molding compound in the injection mold can be pushed through the at least two ducts to the inlet and through the inlet into the cavity. The plastified molding compound is divided between the at least two ducts downstream of the entry opening in conveying direction, and combined again upstream of the inlet into the cavity.

More preferably, the injection mold has exactly one entry opening for exactly one injection unit. The injection mold may comprise more than one cavity and one inlet into each cavity. If the injection mold has more than one inlet, the injection mold preferably has the at least two ducts per inlet, or has one insert comprising the at least two ducts per inlet.

In the injection mold, in the context of the invention, the at least two ducts are disposed in the same hot runner, especially in the same melt duct of the hot runner. If a hot runner system includes a hot runner distributor having more than one melt duct, there are correspondingly at least two ducts per melt duct of the hot runner, preferably for each hot runner nozzle. The term "hot runner" in the context of the invention refers in each case to one and the same melt duct of the hot runner or to one and the same section or arm of a hot runner system.

The at least two ducts are preferably connected to the same inlet into the same cavity by the first end of each duct. The at least two ducts are further preferably connected by the second end of each duct to the entry opening into the injection mold and to the injection molding machine. In this connection, "connected" is understood to mean fluidically connected, which can also be referred to as "communicating".

The at least two ducts are preferably separated from one another between their first end and their second end, especially by the one-piece component. The component in one-piece form is preferably a rigid component. More preferably, the at least two ducts are separated completely from one another between their first end and their second end.

More particularly, the at least two ducts each open separately by their first end into a first end face in the hot runner, and by their second end into a second end face in the hot runner. The first end face is disposed with a smaller distance from the respective inlet into the cavity than the second end face, and the second end face is disposed with a smaller distance from the entry opening into the injection mold than the first end face. Preferably, the at least two ducts, in conveying direction, correspondingly begin at the second end face and end at the first end face. The first end face and/or the second end face are preferably planes. In addition, the first end face and/or the second end face may have elements of a rotational locking means such as tongue-and-groove connection or a fitted key. Moreover, the planes of the first end face and of the second end face preferably form an angle of less than 30°, further preferably less than 10° and especially less than 5°, such that the first end face and the second end face are arranged essentially parallel to one another in the hot runner.

In addition, the first end face and/or the second end face are preferably arranged essentially vertically with respect to conveying direction or to a longitudinal hot runner axis. What is meant by "essentially perpendicular" is an angle within a range from 45° to 135°, more preferably from 70° to 110° and especially from 80° to 100°, for example 90°.

The at least two ducts are preferably disposed at a distance from the inlet, i.e. the tip, of the hot runner nozzle, the distance preferably being 1.5 times the hot runner nozzle diameter at the inlet. The distance is, for example, within a range from 10 mm to 15 mm if the hot runner nozzle diameter at the inlet is 8 mm.

A section of the hot runner bounded by the first end face and the second end face may also be regarded as a duct section of the hot runner. Correspondingly, in the duct section of the hot runner, no exchange of plastified molding compound between the at least two ducts takes place. The plastified molding compound comprising the first molding compound and optionally the at least one further molding compound is split and pushed through each of the at least two ducts in at least two separate streams. More particularly, the at least two ducts do not have any passages and/or apertures to one another between their first end and their second end. Correspondingly, no mixing of the at least two separate streams takes place between the at least two ducts. More particularly, the at least two ducts serve to reduce mixing of the overall stream of the plastified molding compound. The two separate ducts thus counteract homogeneous mixing of the first molding compound with the further molding compound, such that reproducibility is assisted.

In the process of the invention, the at least two ducts may each especially at least partly form a spiral or run on a curved track and/or run straight. When the at least two ducts in the process run straight through the hot runner, the at least two ducts can also be referred to as straight bores. In this case, the at least two ducts preferably run parallel to the longitudinal hot runner axis. A progression of the at least two straight ducts where these run in an inclined manner in relation to the longitudinal hot runner axis is also possible. The inclination imposes a slight twist on the plastified molding compounds.

In the injection mold of the invention, the at least two ducts each at least partly form a spiral. A spiral in the context of the invention is understood to mean a three-dimensional spiral that can also be referred to as a helical line.

By virtue of the spirals respectively formed by means of the at least two ducts, a twist is imposed on the plastified molding compound, which is reflected in the marbling pattern of the molding produced.

More particularly, the at least two ducts each have a center axis, with the center axis of the respective duct in the form of the spiral arranged around the longitudinal hot runner axis. Further preferably, the center axes of the at least two ducts at each position are disposed with the same distance from one another, and further preferably also with the same distance from the longitudinal hot runner axis. Alternatively, the distance between the center axes of the at least two ducts may also vary, and may increase or decrease in conveying direction. The center axis in each case runs through the centers of the cross-sectional areas of the respective duct.

The spirals may be right-handed or left-handed in conveying direction.

The spirals that are each formed by one of the at least two ducts preferably have the same geometry, such as slope and number of windings, and are offset from one another by a radial angle with regard to the longitudinal hot runner axis. The slope reported is especially the slope angle which, for example with a constant slope and constant diameter, is defined as follows:

$$\alpha = \arctan\left(\frac{S}{\pi \cdot D}\right)$$

with α: slope angle, S: distance in longitudinal hot runner axis direction which is covered in a complete winding and can also be referred to as pitch height, and D: diameter of the spiral.

The spiral preferably has a slope of less than 70° at at least one position.

The spiral which is formed by one of the at least two ducts in each case may have a constant slope. The constant slope is preferably within a range from 5° to less than 60°, further preferably from 10° to 40° and especially preferably from 15° to 30°. For example, the constant slope is 20°.

Preferably, the spiral has different slopes at each of at least two different positions. The at least two different positions on the spiral preferably have a different distance from the inlet into the cavity. Preferably, a first slope of the spiral at a first position differs from a second slope of the spiral at a second position by at least 20°; preferably, a difference, especially a maximum difference, of the first slope and the second slope is more than 30° and less than 90°, for example 60°.

Preferably, the slope of the spiral decreases in a direction from the entry opening to the inlet. For instance, the slope of the spiral, for example in conveying direction of the plastified molding compound, may vary from a first position, for example at the second end face, relatively close to the entry opening, of greater than 70° to a second position at the first end face, close to the cavity, of less than 30°. The change, especially the continuous change, from a steep slope to a gentle slope in conveying direction of the plastified molding compound enables favorable entry in terms of flow and simultaneously the application of a significant twist at the exit from the at least two ducts.

Preferably, the spiral has a number of windings, which can also be referred to as rotations, and the number of windings is further preferably within a range from more than 0.25 to 5. Correspondingly, the spiral preferably covers an angle of rotation of more than 90° to 1800°. Further preferably, the number of windings is within a range from more than 0.25 to 3, especially within a range from more than 0.50 to 3, for example within a range from 0.51 to 2.

The hot runner, preferably for each melt duct, preferably has two to eight, more preferably three to eight, further preferably three to six, for example three, four or six, ducts, which can also be referred to as holes, passages or bores.

The shape, number and arrangement of the at least two ducts influence the geometry of the marbling pattern created. The at least two ducts may have different cross-sectional geometries and/or different cross-sectional sizes. The at least two ducts preferably have the same cross-sectional geometry and the same cross-sectional size for each hot runner.

When the at least two ducts each at least partly form a spiral, the at least two ducts may each be designed, for example, as a screw flight or wound bore, which may also be referred to as curved bore.

If the at least two ducts are designed as a screw flight, a portion of the one-piece component that separates the at least two ducts from one another may form multiple vanes. More particularly, the number of vanes is equal to the number of the at least two ducts, which, in this case, are separated from one another in cross section by a land. The execution of each of the at least two ducts as a screw flight may also be described such that a multivane land which is rotated in radial direction along the preferably central longitudinal hot runner axis is disposed in a cylindrical flow duct bore. Further preferably, the at least two ducts are bounded by two cylinders in a concentric arrangement, each of which are parts of the respective outer face. More particularly, the at least two ducts are bounded by the same two cylinders in a concentric arrangement.

The at least two ducts preferably each have, in a radial cross section of the hot runner, a round, ellipsoidal, ring segment-shaped or polygonal, such as hexagonal or triangular, cross-sectional area. The triangular cross-sectional area may have at least one curved side line. A triangular cross-sectional area having at least one curved side or a ring segment-shaped cross-sectional area preferably takes the form of a screw flight in each case in the execution of the at least two ducts. The ring segment preferably covers an angle within a range from 100° to 180°. Especially when the number of the at least two ducts is at least four, the angle of the ring segment may be less than 100°. If the ducts have a triangular cross section and intervening walls are formed between the at least two ducts as screw flight, this may also be described in such a way that the hot runner has a cylindrical central melt duct bore in which there is disposed a spindle corresponding to the vanes that separates the at least two ducts from one another. If the at least two ducts are each designed as a wound bore, the at least two ducts preferably each have a round, ellipsoidal or polygonal, such as hexagonal, cross-sectional area.

The cross-sectional area of the duct section of the hot runner in which the at least two ducts are disposed preferably has an opening ratio which is the ratio of the area available for flow to the total area and is 40% to 80%, further preferably 50% to 75%. The calculation of the opening ratio is preferably based on a cross-sectional area, especially a round cross-sectional area, the radius of which corresponds to the maximum distance of a wall of the at least two ducts from the central longitudinal hot runner axis. The opening ratio may, for example, be 68% in the case of two ducts, each of which forms a spiral in the form of a screw flight with variable slope of 90° to 30°, and 51% in the case of three ducts, each of which forms a spiral in the form of a screw flight with variable slope of 90° to 30°. Preferably, the areas available for flow in the first end face and in the second end face into the at least two ducts or out of the at least two ducts are essentially the same. Correspondingly, the entry areas and the exit areas of the at least two ducts preferably differ from one another by less than 30%, more preferably by less than 10% and especially preferably by less than 5%, based in each case on the entry area. This relates to the individual ducts of the at least two ducts and to the sum total of the entry areas and exit areas of the at least two ducts.

The hot runner, especially the duct section of the hot runner, may be in one-piece or multipiece form. In the multipiece embodiment, the component in one-piece form constitutes the immediate boundary of the at least two ducts. The one-piece component may be formed by a portion or section of the hot runner; more particularly, the duct section or a portion of the duct section of the hot runner may be in one-piece form and may be the component in one-piece form. Alternatively, the insert may be accommodated in the duct section as component in one-piece form. In addition, the at least two ducts may be disposed, for example, directly in a hot runner nozzle cap in one-piece form, which may also be referred to as a screw-in part.

In particular, outer faces, preferably all outer faces, of the at least two ducts that are preferably fully closed are bounded by the one-piece component. The first end face and the second end face, in the cross section of the at least two ducts, are free of material of the one-piece component, such that the plastified molding compound can pass through the first end face and the second end face.

The one-piece component may be part of the hot runner, especially the insert. What is meant by "in one-piece form" is more particularly that the one-piece component is produced from a continuous material and especially does not have any bonds, for example weld seams and/or solder seams. For example, the walls of the at least two ducts, especially when they are in the form of vanes, may be molded onto a hollow cylindrical basic shape of the insert or onto a fully cylindrical portion of the insert in a central arrangement. A continuous material is understood to mean a material having a homogeneous composition over the entire one-piece component. The one-piece component is especially not composed of multiple layers or multiple components and/or does not have any coatings of a further material.

The use of the one-piece component which is especially produced by means of an additive method enables simplified production of the injection mold.

Preferably, the hot runner comprises the insert as a one-piece component, which preferably has a cylindrical outline. More particularly, the at least two ducts are disposed in the insert. Correspondingly, a hot runner may be used with varying inserts having ducts each having different geometries, which enables high flexibility in the configuration of the marbling patterns with just one injection mold. Use of the insert allows creation of different marbling patterns in rapid sequence by means of the same injection mold. The different inserts may be exchanged as required in the hot runner. The insert is preferably designed for an accurate fit with a preferably central cylindrical bore, especially the melt duct, in the hot runner that forms the actual flow duct outside the insert.

Preferably, a ratio of length to diameter of the insert is from 4:1 to 1:1, for example 2:1, and a ratio of length to diameter of the at least two ducts is in each case from 20:1 to 2:1, further preferably from 10:1 to 8:1. A wall thickness between the at least two ducts, especially a thickness of the vane or of the land, is preferably 10% to 30%, preferably 15% to 20%, based on the diameter of one of the at least two ducts.

As well as the insert, the hot runner may have one, two or more disks that may serve for positioning and/or fixing of the insert in the hot runner. More preferably, the insert is disposed between two disks. The disks preferably have a central bore.

Additionally proposed is a process for producing the injection mold of the invention, wherein at least a portion of the hot runner, preferably the one-piece component, especially at least the insert, is produced by an additive method, especially by means of 3D printing. The production of the at least two ducts by an additive method enables production of ducts with more complex, especially more complex spiral, progressions. Moreover, this mode of production, similarly to the case of cast components, leads to a surface roughness that has a positive effect on the marbling pattern. Preferably, the additive method produces layers having a layer height of in each case 0.08 mm to 0.2 mm, for example 0.1 mm.

Moreover, the production of the one-piece component, especially the insert, by means of the additive method, enables creation of an undercut in order to achieve a greater area available for flow through the at least two ducts. What is meant by an undercut in the context of the invention is that a diameter of an insert melt duct increases in conveying direction. More particularly, an insert melt duct in a central arrangement which is disposed at a second end face may have a diameter that increases in conveying direction.

The additive method also enables production of ducts, where the at least two ducts have an undercut and each especially have more than 0.5 winding. An undercut with regard to the at least two ducts is especially understood to mean that the cross-sectional areas of a duct do not overlap at the first end face and at the second end face in axial projection.

Additive methods used may include laser welding methods or melt layering methods such as fused deposition modeling (FDM) or fused filament fabrication (FFF). For production of the one-piece component, especially the insert, it is possible to use a metal injection molding feedstock (MIM feedstock), for example Catamold®, as material. MIM feedstock materials comprise various steel types, for example stainless steels or tool steels, such that the one-piece component produced, especially the insert, can be specifically matched to the end use.

Preferably, the one-piece component and/or at least the insert is produced from a metal-comprising powder. Further preferably, the one-piece component and/or at least the insert is produced from a composition comprising, based on the composition, 30% by volume to 70% by volume, more preferably 40% by volume to 60% by volume, of at least one inorganic powder and 30% to 70% by volume, more preferably 40% to 60% by volume, of at least one binder. The particle size of the at least one inorganic powder is preferably from 0.5 μm to 50 μm, more preferably from 0.1 μm to 30 μm. In addition, the at least one inorganic powder preferably comprises a metal, a metal alloy, a precursor compound of a ceramic material, mixtures thereof. More preferably, the at least one inorganic powder preferably consists of a metal, a metal alloy, a precursor compound of a ceramic material, or mixtures thereof. The at least one binder preferably comprises a polymer composition, especially POM. Further preferably, the at least one binder consists of POM. The composition may be used in pellet or filament form.

The hot runner, including the hot runner distributor, is heated to temperatures at which the molding compounds are processible plastically, i.e. to a temperature higher than the melting temperature of the molding compounds. Typically, closed-loop control with permanent temperature measurement is used.

The hot runner especially has a hot runner nozzle disposed at the inlet into the respective cavity. A temperature of the hot runner nozzle is preferably within a range from 150° C. to 450° C., more preferably from 180° C. to 400° C. The first molding compound and the at least one further molding compound at the inlet into the cavity preferably have a temperature in the range from 150° C. to 450° C., more preferably from 180° C. to 400° C. The injection pressure or hold pressure in the cavity is preferably 400 bar to 2000 bar. The hot runner nozzle preferably comprises a particularly thermally conductive material.

The hot runner nozzle may be designed as a needle valve nozzle, open nozzle with torpedo, open nozzle with straight passage, or open nozzle with a tip that may comprise multiple inlets into the cavity. Since the hot runner is heated to a temperature above the temperature of the further parts of the injection mold, heat is removed continuously from the hot runner. The torpedo in an open hot runner nozzle serves to keep the temperature of the free-flowing molding compounds homogeneous in spite of the removal of heat. Typically, the torpedo is in direct thermal contact with a heated portion of the hot runner nozzle.

A needle valve nozzle comprises a receiving device and drive device for a closure element and a closure element, especially a needle, which is guided, for example, by a guide bushing connected to a nozzle body of the hot runner nozzle by two mounts. The closure element serves to open and close the hot runner nozzle. The hot runner, further preferably the one-piece component and especially the insert, preferably has a central bore along the longitudinal hot runner axis for passage of the closure element. If the one-piece component, especially the insert, has the central bore in addition to the at least two ducts, the one-piece component, or the insert, may be used in combination with a needle valve nozzle.

The needle is especially guided through the insert in order then to close the hot runner nozzle at the inlet into the cavity. The insert or the central bore serves for guiding of the needle, which moves relative to the insert and the at least two ducts through the central bore.

The hot runner having the at least two ducts may be used in combination with an open nozzle. If there is an open nozzle, the hot runner, preferably the one-piece component, especially the insert, may have a central solid cylinder disposed between the at least two ducts, especially in place of the central bore present in the needle valve nozzle. Moreover, the hot runner, in addition to the at least two ducts, may have a torpedo which may be disposed beyond the at least two ducts in conveying direction.

The at least two ducts, especially with the insert, may be disposed in the hot runner nozzle of the hot runner, in a distributor of the hot runner and/or adjacent to or directly at the entry opening into the injection mold in the hot runner. Further preferably, the hot runner nozzle has a hot runner nozzle head, which is also referred to as nozzle cap or screw-in part, and in which the at least two ducts are preferably disposed. The hot runner nozzle head may comprise the insert comprising the at least two ducts. In addition, the hot runner nozzle may be connected by means of a screw connection to further parts of the hot runner. By means of the screw connection, the hot runner nozzle as closure part is exchangeable, and the screw connection allows the insert to be fixed in the hot runner.

The arrangement of the at least two ducts in the injection mold and especially in the hot runner nozzle offers the advantage that the at least two ducts are disposed as close as possible to the cavity and hence the twist in post on the molding compounds is transferred more directly into the molding and the separation of the different melt portions is maintained for as long as possible.

For performance of the process of the invention for producing reproducibly marbled moldings, any kind of hot runner nozzle is usable. Depending on the configuration of the hot runner nozzle, especially as open nozzle or needle valve nozzle with different mounts of the needle, different marbling patterns are produced in the moldings. For instance, even the use of a needle valve nozzle leads to a highly pronounced marbling pattern. The specific form of the marbling pattern is influenced by the geometry of the holder of the needle, and it is possible for the insert to form the mount for the needle.

In the case of use of an open nozzle without the at least two ducts, a circular uniform distribution of color would be visible. The optical effect which is generated by the use exclusively of an open nozzle can be described as concentric circles. If at least two, for example three, four or six, ducts are used, the circular structure is interrupted, and slight vortexing of the first molding compound in the at least one further molding compound is visible. A number of strips corresponding to the number of ducts that generate weld lines is apparent.

By execution of the at least two ducts each in the form of a wound bore, vortexing of the first molding composition in the at least one further molding composition is enhanced. If the at least two ducts are each executed as a screw flight, waves in the form of strips are formed as a marbling pattern with very good reproducibility.

Operative examples of the invention are shown in the figures and will be more particularly described in the description which follows. The invention is not limited to the working examples described here and the aspects emphasized therein. Instead, within the scope described by the claims, there is a multitude of possible modifications that are within the abilities of the person skilled in the art.

Figure 2:
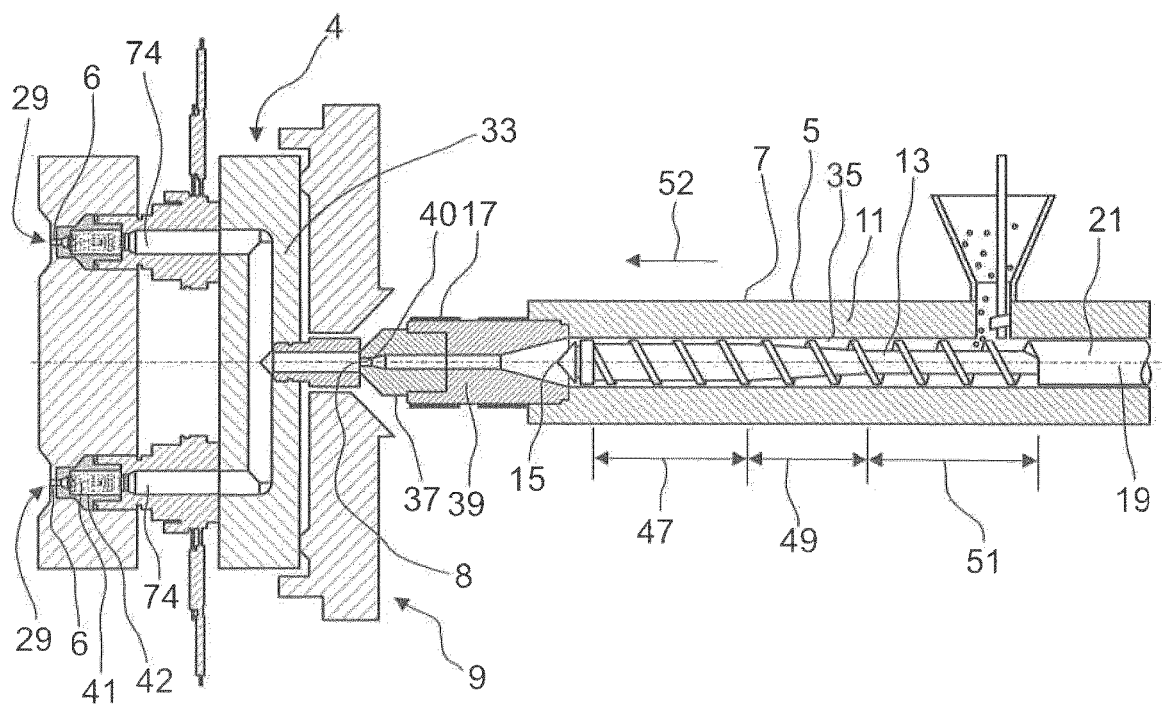
Figure 3:
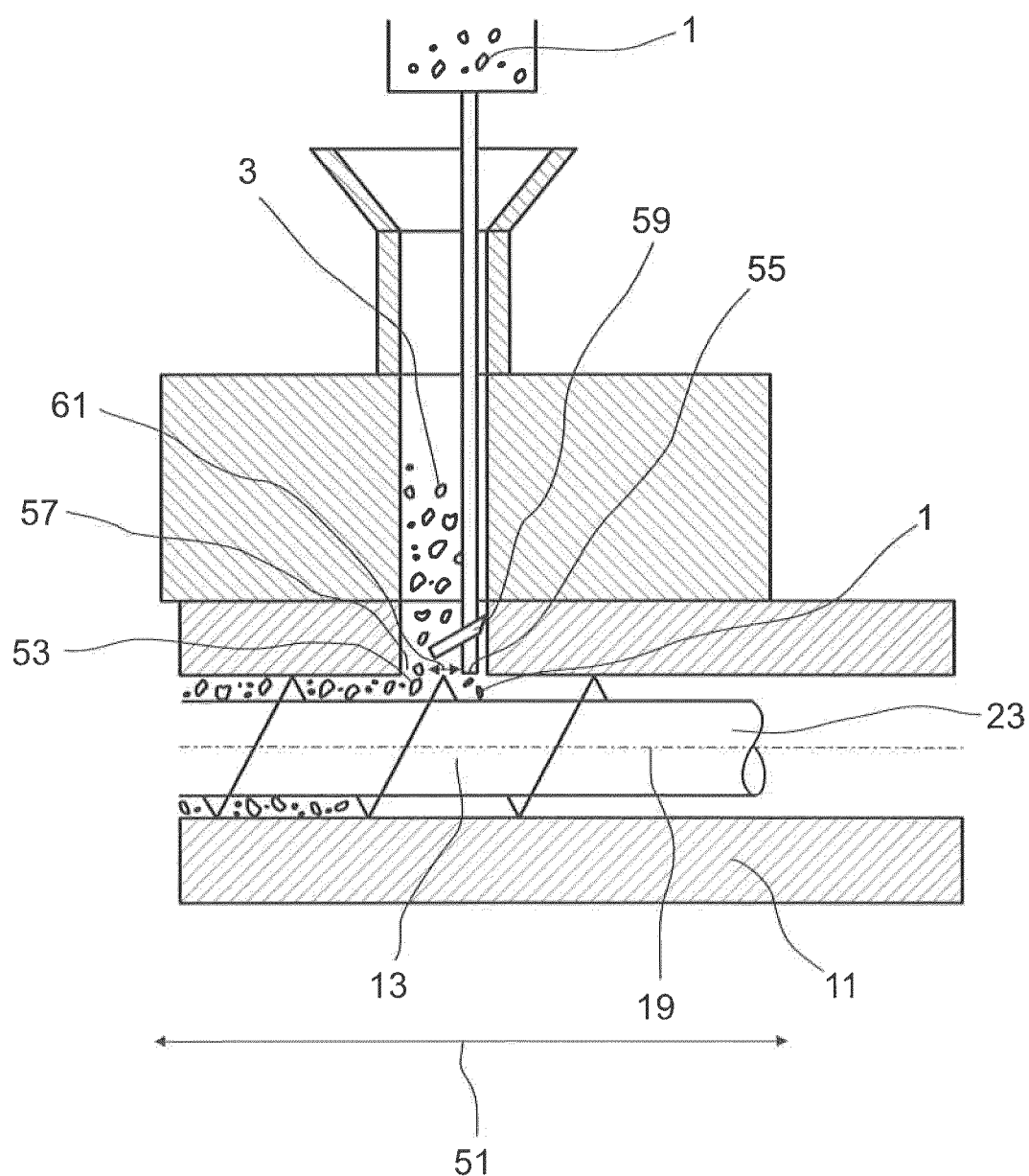
Figure 4:
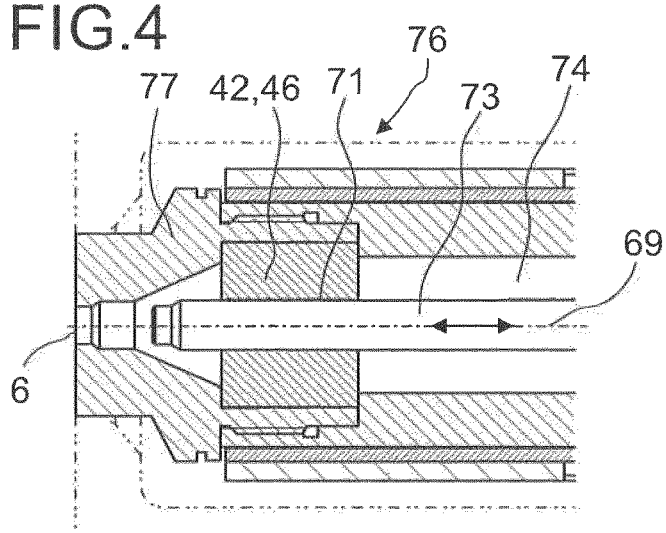
Figure 5:
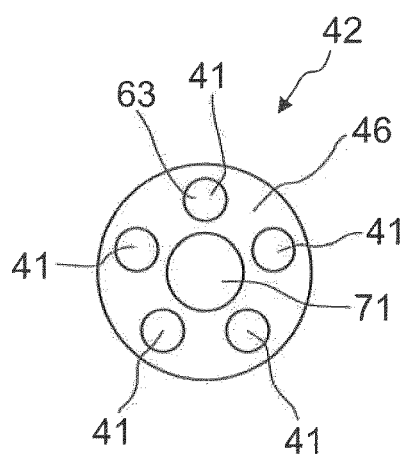
Figure 6:
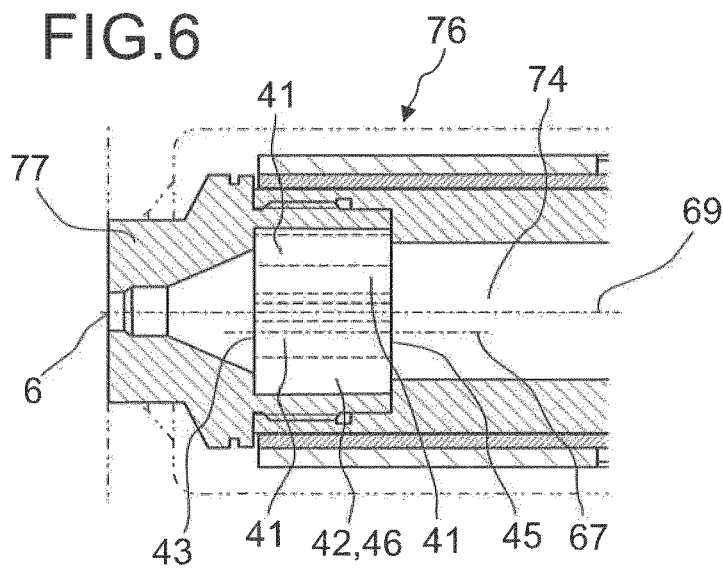
Figure 7:
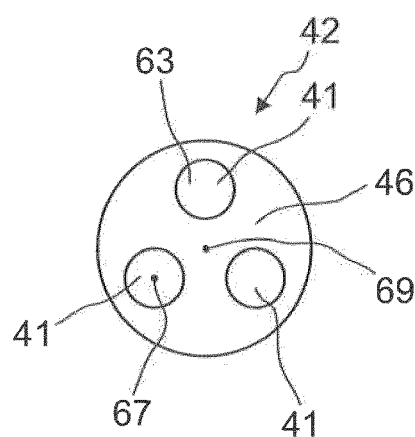
Figure 8:
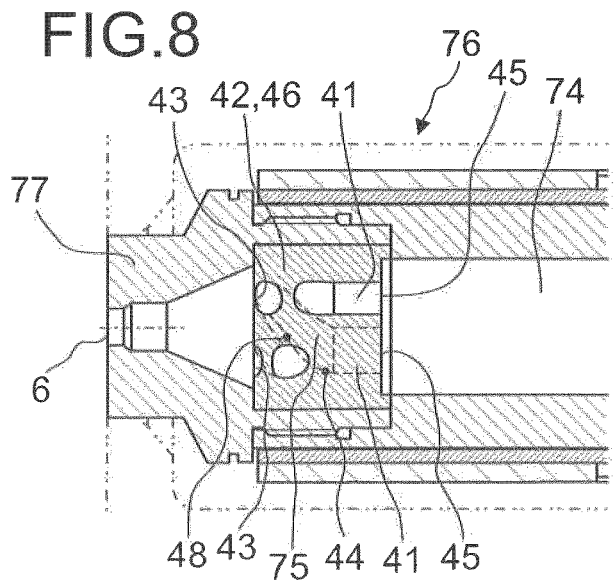
Figure 9:
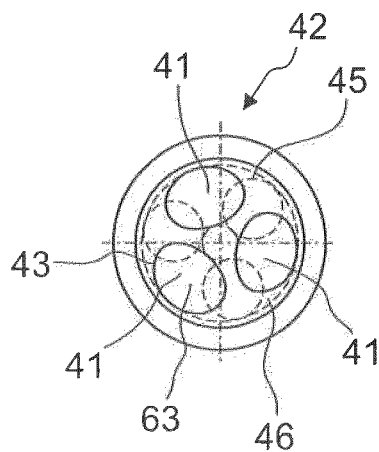
Figure 26:
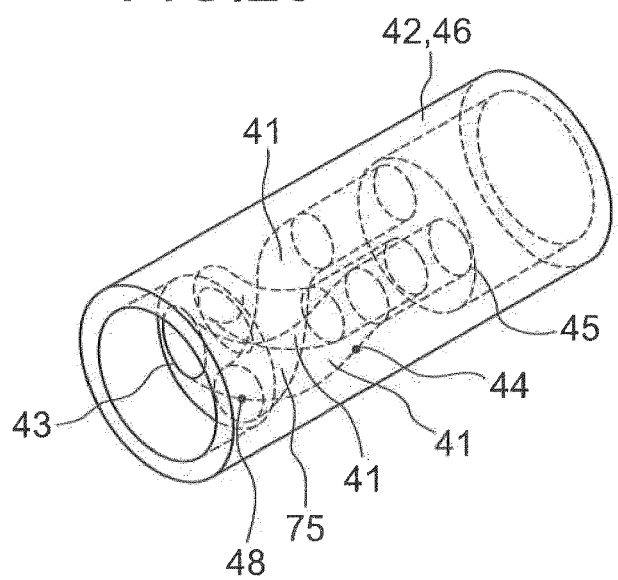
Figure 27:
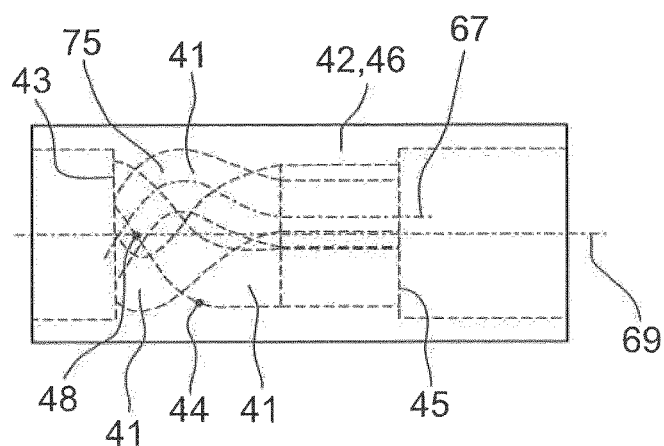
Figure 28:
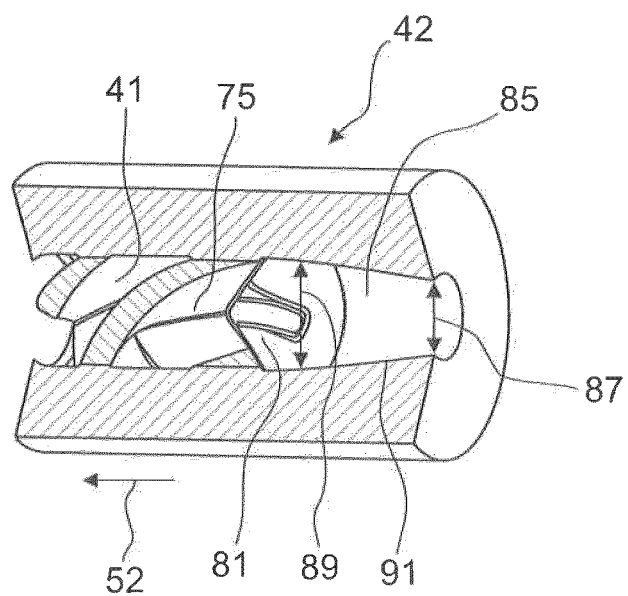

The figures show:

FIG. 1 a first schematic diagram of an injection molding machine with injection mold, FIG. 2 a second schematic diagram of a screw injection molding machine with injection mold, FIG. 3 a detail of a screw injection molding machine, FIGS. 4, 6 and 8 each a detail of a hot runner, FIGS. 5, 7 and 9 each a cross section of the detail of the hot runner according to FIGS. 4, 6 and 8 respectively, FIGS. 10 to 21 each a top view or a perspective view of various embodiments of the at least two ducts, FIGS. 22 to 27 each a top view, a perspective view or a longitudinal section of two further embodiments of the at least two ducts, and FIG. 28 an insert with an undercut.

FIG. 1 shows a schematic diagram of a screw injection molding machine 7 comprising an injection unit 5. The injection unit 5 comprises a barrel 11 with an internal free volume 31, a screw 13 with a screw tip 15, and a nozzle 17 having a nozzle head 37 and a nozzle body 39. The screw 13 is rotatable and mounted in the direction of a longitudinal axis 19 of the barrel 11. The screw is in a backward position 23 in the barrel 11, with a distance 25 extending between the nozzle 17 and the screw tip 15, such that there is a clear space 27 between the nozzle and the screw tip 15 in the barrel 11.

The novel 17 having an exit opening 40 is adjoined by an injection mold 9 with hot runner 4 and two cavities 29. The injection mold 9 is shown in enlarged form. The cavities 29 have an internal volume and are merely indicated here. In addition, the injection mold 9 has an entry opening 8 into the injection mold 9 and two inlets 6 into the cavities 29. Between the exit opening 8 and the inlets 6 is disposed, as gate, a hot runner 4 with a hot runner distributor 33, which can also be referred to as distributor bar. A melt duct 74 leads to each cavity 29 from the hot runner distributor 33, and each of the two melt ducts 74 of the hot runner 4 has an insert 42 with ducts 41 into which the melt duct 74 is divided in the insert 42.

In the injection molding machine 7, the screw 13 has a metering zone 47, a compression zone 49 and an intake zone 51. The screw 13 can be used to convey molding compounds in a conveying direction 52 in the clear space 27. The clear space 27 is part of the interior 35 of the barrel 11, which is bounded by the barrel 11 and the screw 13.

FIG. 2 shows a schematic diagram of a screw injection molding machine 7 having an injection mold 9 corresponding essentially to the diagram of FIG. 1. However, the screw 13 according to FIG. 2 is in a forward position 21 in the barrel 11. By comparison with FIG. 1, the distance 25 has been reduced by an advance of the screw 13.

FIG. 3 shows a detail of the screw injection molding machine 7 according to FIG. 1. A portion of the intake zone 51 of the screw 13 present in the barrel 11 is shown. The screw 13 is movable along the longitudinal axis 19 of the barrel 11, and is in the backward position 23. Part of the screw 13 is beneath a feed opening 53. In the embodiment shown, a first molding compound 1 and a further molding compound 3 are fed to the screw 13 through the feed opening 53. The feed opening 53 has a first region 55 for feeding in the first molding compound 1 and a second region 57 for feeding in the further molding compound 3. By virtue of a cover 59, there is a second distance 61 between the first region 55 and the second 57, by means of which the first molding compound 1 is fed in spatially separately from the further molding compound 3.

FIG. 4 shows a hot runner nozzle 76 of a hot runner 4 with a hot runner nozzle cap 77. An insert 42 is disposed in the hot runner nozzle cap 77 as a one-piece component 46. A needle 73 is guided through the insert 42, which is movable along a longitudinal hot runner axis 69 and can close an inlet 6 into a cavity 29.

FIG. 5 shows a cross-sectional view of the insert 42 according to FIG. 4. The insert 42 has a central bore 71 through which the needle 73 is guided. In addition, the insert 5 has ducts 41 in the form of straight bores having a round cross-sectional area 63. The ducts 41 are passage bores that run parallel to the longitudinal hot runner axis 69.

FIGS. 6 and 7, and 8 and 9, correspond essentially to FIGS. 4 and 5, except that the inserts 42 are of different configuration.

According to FIGS. 6 and 7, the insert 42 does not have a central bore 71 since the hot runner nozzle 76 is designed as an open nozzle without needle 73. The same applies to the portion of the hot runner 4 according to FIGS. 8 and 9.

The insert 42 of the open hot runner nozzle 76 according to FIGS. 6 and 7 has three straight ducts 41 with centre axes 67 that are arranged parallel to the longitudinal hot runner axis 69.

In FIGS. 8 and 9, a hot runner nozzle 76 in the form of an open nozzle is likewise shown. The insert 42 according to FIGS. 8 and 9 comprises three ducts 41, with each duct 41 at least partly forming a spiral 75 having a greater slope in a first position 44 than in a second position 48. Each duct 41 has a first end 43 and a second end 45, with the first end 43 arranged adjacent to the inlet 6. The ducts 41 each have an ellipsoidal or round cross-sectional area 63.

FIGS. 10 to 21 show six further embodiments of an insert 42, each of which is shown in a top view or perspective view. In FIGS. 10 to 21, ducts 41 in each case form a spiral 75, with the center axis 67 of each duct 41 disposed in the form of the spiral 75 around the longitudinal hot runner axis 69 in each case and having a particular number of windings 50.

Figure 10:
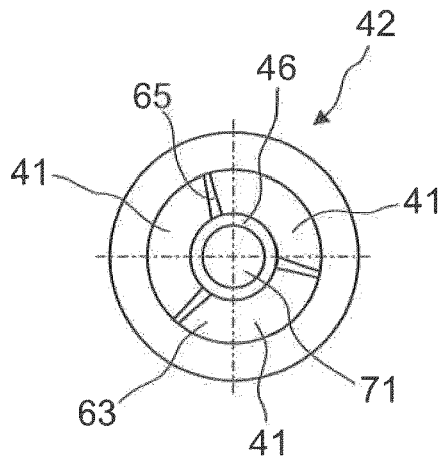
Figure 11:
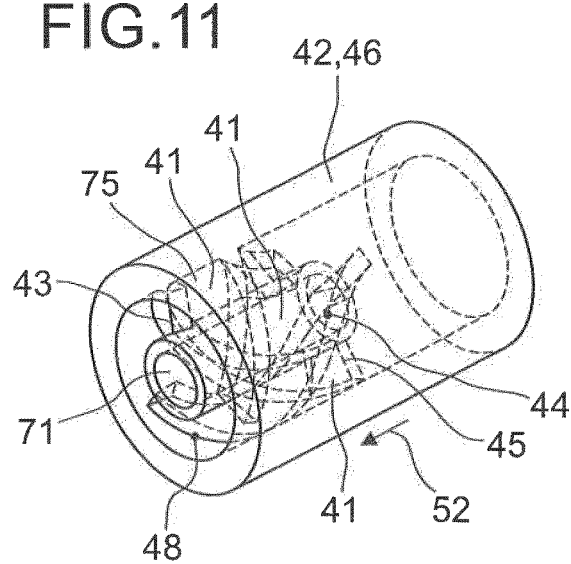

According to FIGS. 10 and 11, the insert 42 has three ducts 41 and a central bore 71 for guiding the needle. The slope of the spirals 75 decreases in conveying direction 52, i.e. in the direction from the entry opening 8 of the injection mold 9 to the inlet 6 and from the second end 45 to the first end 43 of each duct 41. There is a greater slope in a first position 44 than in a second position 48. The slope changes from about 90° to a relatively gentle slope of about 30°. This results in favorable entry in terms of flow and a significant twist, which is imposed on the plastified molding compound at an outlet, i.e. at the first end 43 of every duct 41. Along the longitudinal hot runner axis 69, there is a constant free cross-sectional area 63 and hence a constant opening ratio. The spirals 75 each have a half winding 50, such that a land 65 between two ducts 41 is rotated by 180° compared to the first end 43 and second end 45.

Figure 12:
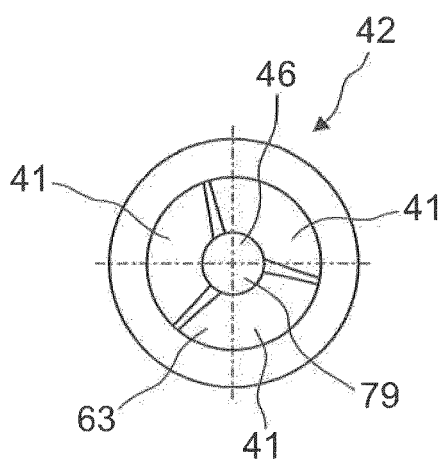
Figure 13:
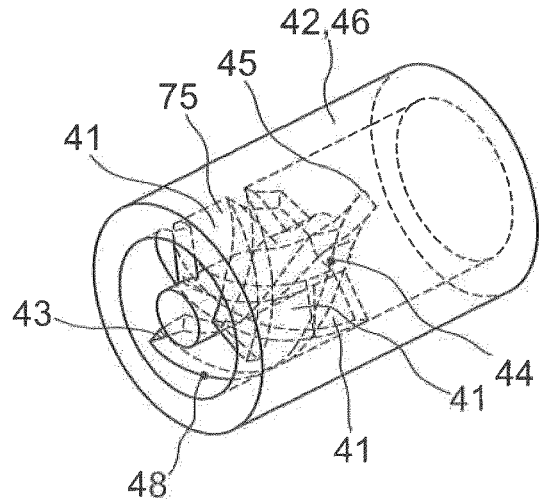

The insert 42 according to FIGS. 12 and 13 corresponds to the insert according to FIGS. and 11, with the difference that it is an insert 42 for open nozzles since the ducts 41 are divided from one another by a solid cylinder 79 in the longitudinal hot runner axis 69.

Figure 14:
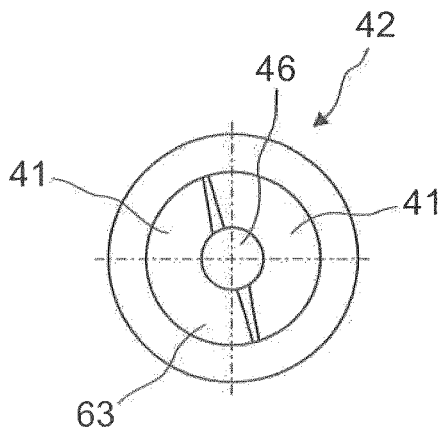
Figure 15:
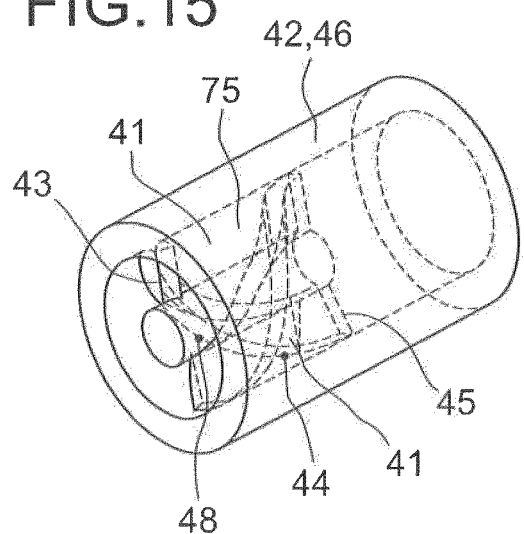

The insert 42 according to FIGS. 14 and 15 corresponds to the insert 42 according to FIGS. 12 and 13, except that only two ducts 41 are present.

Figure 16:
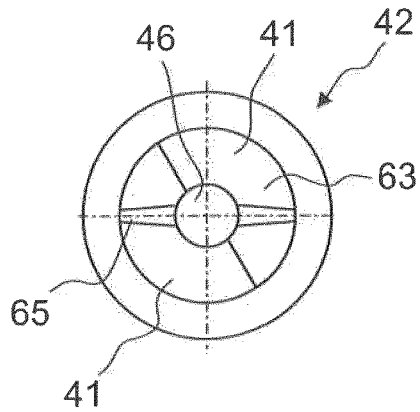
Figure 17:
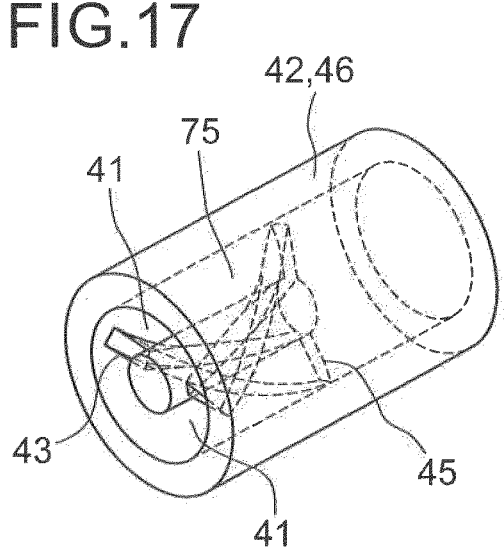

The insert 42 according to FIGS. 16 and 17 corresponds essentially to the insert 42 according to FIGS. 14 and 15, except that the spirals 75 have a constant slope and each have only about one third of a complete winding 50, such that the land 65 is rotated by about 120° compared to the first end 43 toward the second end 45. The slope is about 60°.

Figure 18:
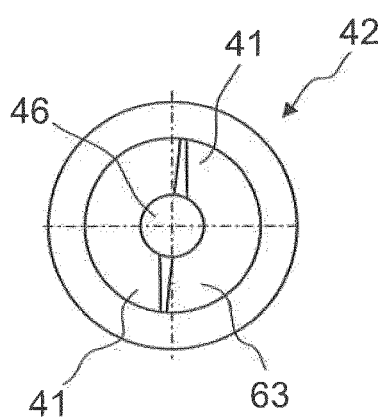
Figure 19:
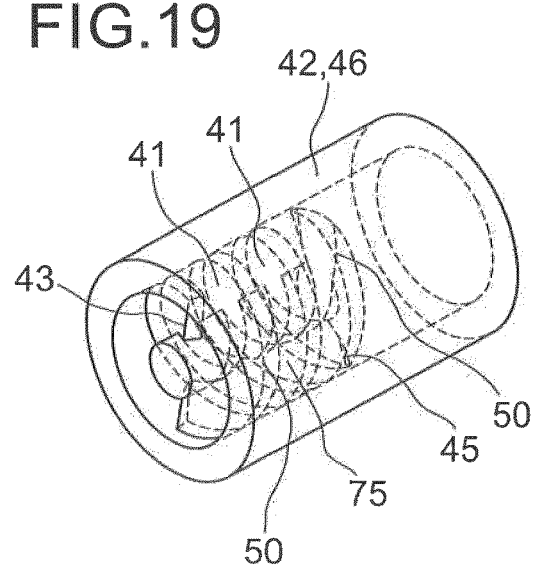

The insert 42 according to FIGS. 18 and 19 corresponds essentially to the insert 42 according to FIGS. 16 and 17, except that the spirals 75 have 1.5 windings 50, such that there is a slope of about 20°.

Figure 20:
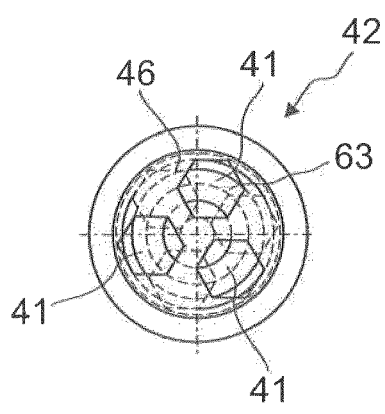
Figure 21:
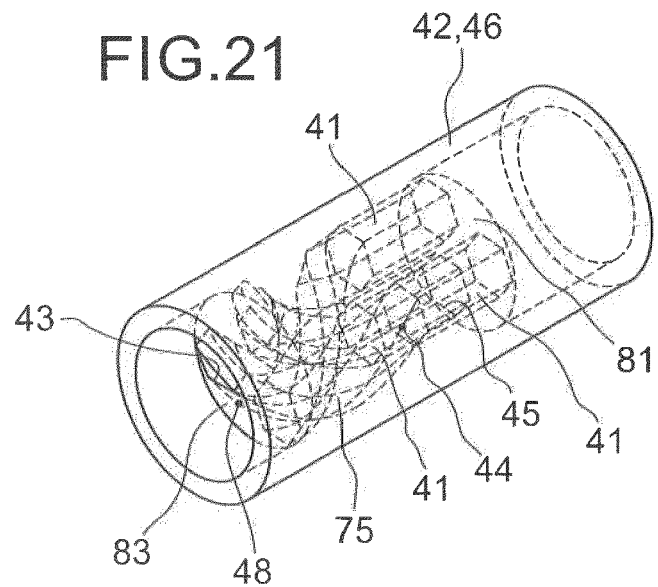

The insert 42 according to FIGS. 20 and 21 is similar to the insert 42 according to FIGS. 12 and 13. There are three ducts 41 each in the form of a spiral 75 which have a greater slope in a first position 44 than in a second position 48. The ducts 41 of the insert 42 according to FIGS. 20 and 21 each partly form a spiral 75, and the first ends 43 of the ducts 41 open into a first end face 83. A further portion of the ducts 41 runs straight and opens by the second end 45 into a second end face 81. In addition, the ducts 41 have a hexagonal cross-sectional area 63.

Figure 22:
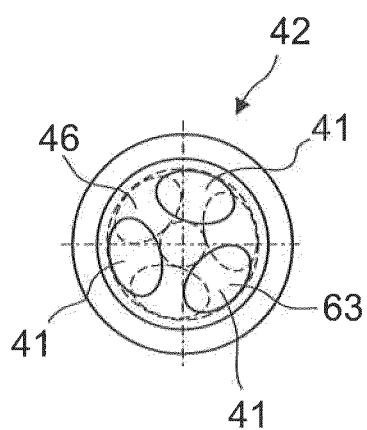
Figure 23:
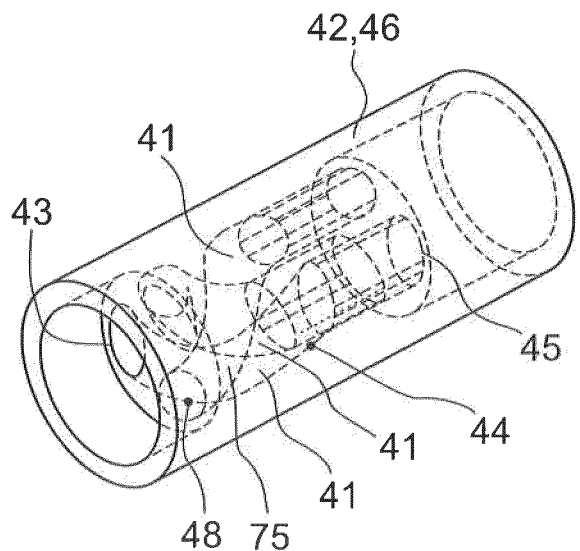
Figure 24:
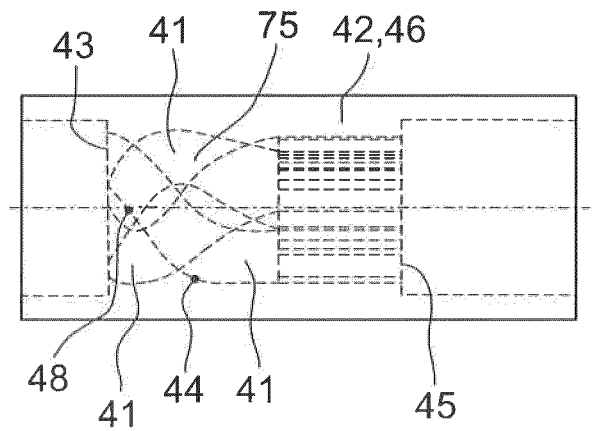
Figure 25:
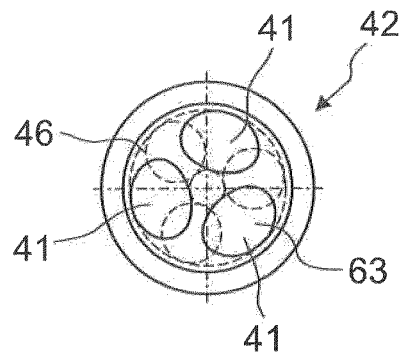

The insert 42 shown respectively in a top view, in perspective view and in a longitudinal section in FIGS. 22, 23 and 24 corresponds essentially to the insert 42 according to FIGS. 25, 26 and 27, except that the ducts 41 have a constant ellipsoidal cross-sectional area 63. By virtue of a constant cross-sectional area 63 as an ellipse, a higher opening ratio in the cross-sectional area 63 is achieved compared to a partly round cross-sectional area 63.

The insert 42 according to FIGS. 25, 26 and 27 corresponds to the insert 42 according to FIGS. 6 and 7, and essentially to the insert 42 of FIGS. 22, 23 and 24, except that the ducts 41 have a variable cross-sectional area 63. The ducts 41 have a round cross-sectional area 63 at the second end 45, and also along the straight portion of the ducts 41. In the spiral 75, the cross-sectional area 63 varies from a round form to a flattened ellipsoidal form since a slope of the center axes 67 of the ducts 41 increases relative to the longitudinal hot runner axis 69.

FIG. 28 shows an insert 42 having an undercut 91. The insert 42 comprises three ducts 41, each of which forms a spiral 75 with a variable slope. In the insert 42, an insert melt duct 85 ends at a second end face 81 of the ducts 41 in conveying direction 52. The insert melt duct 85 has the undercut 91, such that a first diameter 87 of the insert melt duct 85 is smaller than a second diameter 89 of the insert melt duct 85 at the second end face 81. Correspondingly, the diameter 87, 89 of the insert melt duct 85 increases in conveying direction 52.

EXAMPLE

Production of Coasters

For production of coasters, a hydraulic injection molding machine with locking force 1000 kN was used, comprising a barrel of internal diameter 25 mm, and an injection mold having two cavities and a hot runner system.

For two coasters, i.e. for each injection operation, which is also referred to as cycle or shot, a first amount of a first molding compound is provided in each case. The first molding compound consisted of black colored pellets in the form of cylindrical pellets having a respective diameter of 1 mm and a length of 2 mm, which comprised a black color and having a concentration of 20% by weight in PBT. The first amount had a mass of 0.03 g, which corresponded to five pellets.

In addition, a second amount of a further molding compound was provided for every two coasters. The second amount had a mass of 40 g. The further molding compound comprised 39.77 g of an uncolored PBT pellet material and 0.23 g of a colored PBT pellet material that comprised a further colorant in concentrated form per second amount. The further molding compound was in the form of a pellet mixture, and the uncolored PBT pellets and the colored PBT pellets were premixed in the further molding compound.

In each cycle, a first amount of the first molding compound was introduced onto the screw that was in a backward position. Then the screw was moved into a forward position toward the nozzle for injection. For addition of the molding compounds, a metering device with two funnels was used, mounted on the cylinder feed opening. The funnel that was used for the first molding compound opened out via a tube close to the screw flight of the screw in the hollow cylinder. This assured the desired placement position of the first amount.

The plastified molding compounds were injected into the cooled injection mold that comprised the hot runner system and two cavities each having a melt duct with hot runner nozzle, such that two marbled moldings were manufactured in parallel in each cycle. The hot runner kept the plastified molding compound in a liquid state up to the cavity, i.e. up to the molding. The hot runner nozzles used in each case were a needle valve nozzle that was operated hydraulically.

Each melt duct of the hot runner comprised exchangeable inserts that each had a central bore for guiding of the needle. In addition, the inserts each comprised at least two ducts in which the stream of the plastified molding compounds was divided and then combined again in the melt duct upstream of the exit from the hot runner nozzle. Inserts having three or four ducts were used, such that coasters having a pattern comprising a triple or quadruple repetition were obtained. An insert having three ducts was disposed upstream of one of the two hot runner nozzles, and an insert having four ducts upstream of the other of the two hot runner nozzles. It was thus possible, in a single cycle, to produce two identically colored coasters with different, respectively reproducible marbling patterns in just one injection mold.

One of the inserts used had a geometry according to table 1, and the ducts in each case were in the form of screw flights as shown in FIGS. 10 and 11.

TABLE 1

| Starting point of the section of the longitudinal hot runner axis [mm] | Diameter of the spiral [mm] | Slope angle [°] |
| --- | --- | --- |
| 0 | 10 | 72.6 |
| 4 | 10 | 57.9 |
| 8 | 10 | 43.7 |
| 12 | 10 | 32.5 |
| 14 | 10 | 25.5 |

20 coasters were produced in 10 successive cycles, and so the process was repeated several times. Good reproducibility of the resultant marbling pattern was found.

LIST OF REFERENCE NUMERALS 1 first molding compound
3 at least one further molding compound
4 hot runner
5 injection unit
6 inlet
7 screw injection molding machine
8 entry opening
9 injection mold
11 barrel
13 screw
15 screw tip
17 nozzle
19 longitudinal axis of the barrel
21 forward position
23 backward position
25 distance
27 clear space
29 cavity
31 internal free volume
33 hot runner distributor
35 interior
37 nozzle head
39 nozzle body
40 exit opening
41 ducts
42 insert
43 first end
44 first position
45 second end
46 one-piece component
47 metering zone
48 second position
49 compression zone
50 winding
51 intake zone
52 conveying direction
53 feed opening
55 first region
57 second region
59 cover
61 second distance
63 cross-sectional area
65 land
67 center axis
69 longitudinal hot runner axis
71 central bore
73 needle
74 melt duct
75 spiral
76 hot runner nozzle
77 hot runner nozzle cap
79 solid cylinder
81 second end face
83 first end face
85 insert melt duct
87 first diameter
89 second diameter
91 undercut

The invention claimed is:

1. An injection mold for production of marbled moldings, comprising
at least one hot runner, a cavity, an entry opening into the injection mold and an inlet into the cavity, wherein the hot runner has at least two ducts that are connected at a first end of each duct to the inlet into the cavity and at a second end of each duct to the entry opening into the injection mold, wherein the at least two ducts each at least partly form a spiral and the at least two ducts are bounded by a one-piece component, wherein the at least two ducts are separated from one another between their first end and their second end by the one-piece component, wherein the at least two ducts each have a center axis, and the center axis is arranged in the form of the spiral around a longitudinal hot runner axis, and the spiral has different slopes at each of at least two different positions, and wherein the at least two ducts are configured to counteract homogeneous mixing.

2. The injection mold according to claim 1, wherein the spiral has a number of windings, and the number of windings is within a range from greater than 0.5 up to 3.

3. The injection mold according to claim 1, characterized in that the hot runner has three to eight ducts.

4. The injection mold according to claim 1, wherein a first slope of the spiral at a first position differs by at least 20° from a second slope of the spiral at a second position.

5. The injection mold according to claim 1, wherein the spiral has a slope of less than 60° at at least one position.

6. The injection mold according to claim 1, wherein the slope of the spiral decreases in a direction from the entry opening to the inlet.

7. The injection mold according to claim 1, wherein the hot runner has a central bore and optionally a closure element, along the longitudinal hot runner axis.

8. The injection mold according to claim 7, wherein the closure element is a needle.

9. The injection mold according to claim 1, wherein the at least two ducts in a radial cross section of the hot runner each have a round, ellipsoidal, ring segment-shaped, polygonal, hexagonal, or triangular cross-sectional area.

10. The injection mold according to claim 1, wherein the one-piece component is an insert disposed in the hot runner, and the at least two ducts are disposed in the insert.

11. A process for producing an injection mold for production of marbled moldings, wherein the injection mold comprises at least one hot runner, a cavity, an entry opening into the injection mold and an inlet into the cavity, wherein the hot runner has at least two ducts that are connected at a first end of each duct to the inlet into the cavity and at a second end of each duct to the entry opening into the injection mold, wherein the at least two ducts each at least partly form a spiral and the at least two ducts are bounded by a one-piece component, wherein the at least two ducts are separated from one another between their first end and their second end by the one-piece component, wherein the at least two ducts each have a center axis, and the center axis is arranged in the form of the spiral around a longitudinal hot runner axis, and the spiral has different slopes at each of at least two different positions, wherein the at least two ducts are configured to counteract homogeneous mixing, and wherein the one-piece component is produced by an additive method.

12. The process of claim 11, wherein the one-piece component is an insert disposed in the hot runner, and wherein the insert is produced by 3D printing.

* * * * *